United States Patent
Nelson et al.

(10) Patent No.: US 8,208,010 B2
(45) Date of Patent: Jun. 26, 2012

(54) FACE IMAGE CORRECTION USING MULTIPLE CAMERA ANGLES

(75) Inventors: Joakim Nelson, Lund (SE); Johan Gulliksson, Bjärred (SE)

(73) Assignee: Sony Ericsson Mobile Communications AB, Lund (SE)

( * ) Notice: Subject to any disclaimer, the term of this patent is extended or adjusted under 35 U.S.C. 154(b) by 447 days.

(21) Appl. No.: 11/629,671

(22) PCT Filed: Jun. 2, 2005

(86) PCT No.: PCT/EP2005/052538
§ 371 (c)(1),
(2), (4) Date: Dec. 14, 2006

(87) PCT Pub. No.: WO2006/003066
PCT Pub. Date: Jan. 12, 2006

(65) Prior Publication Data
US 2007/0252674 A1   Nov. 1, 2007

Related U.S. Application Data

(60) Provisional application No. 60/585,979, filed on Jul. 7, 2004.

(30) Foreign Application Priority Data

Jun. 30, 2004 (EP) .................................. 04103072

(51) Int. Cl.
*H04N 13/02* (2006.01)

(52) U.S. Cl. ................... 348/50; 348/218.1; 348/14.01; 382/118

(58) Field of Classification Search ............... 348/14.16, 348/113, 116, 118, 140, 142, 143, 148, 50; 382/104, 115–118
See application file for complete search history.

(56) References Cited

U.S. PATENT DOCUMENTS 5,220,429 A * 6/1993 Bergvall ....................... 348/325
(Continued)

FOREIGN PATENT DOCUMENTS

CN       1326574 A    12/2001
(Continued)

OTHER PUBLICATIONS

International Preliminary Report on Patentability for International Application No. PCT/EP2005.052538; Issued Jan. 30, 2007.

*Primary Examiner* — Usman Khan
(74) *Attorney, Agent, or Firm* — Myers Bigel Sibley & Sajovec

(57) ABSTRACT

Methods for adjusting a picture of an object captured by a camera in a mobile radio communication terminal include defining a first camera angle relative to the object and capturing an image of the object by means of the camera from a second camera angle relative to the object. The second camera angle is offset from the first camera angle. The methods further include storing image data relating to the captured image, and generating an angularly adjusted image of the object in response to the image data and an angular relation between the first camera angle and the second camera angle. Corresponding mobile radio communication terminals are also disclosed. The terminals include an image processing system configured to process an image of an object captured by a camera from a second camera angle by generating an angularly adjusted image of the object in response to image data for the image, and in response to an angular relation between the second camera angle and a first camera angle.

19 Claims, 4 Drawing Sheets

U.S. PATENT DOCUMENTS

| | | | |
|---|---|---|---|
| 5,500,671 A | 3/1996 | Andersson et al. | |
| 5,668,595 A * | 9/1997 | Katayama et al. | 348/218.1 |
| 6,094,215 A * | 7/2000 | Sundahl et al. | 348/42 |
| 6,297,846 B1 | 10/2001 | Edanami | |
| 6,449,004 B1 * | 9/2002 | Okisu et al. | 348/44 |
| 6,456,745 B1 | 9/2002 | Bruton et al. | |
| 6,535,793 B2 * | 3/2003 | Allard | 700/259 |
| 6,654,050 B2 * | 11/2003 | Karube et al. | 348/220.1 |
| 6,809,771 B1 * | 10/2004 | Hamaguchi et al. | 348/335 |
| 6,885,392 B1 * | 4/2005 | Mancuso et al. | 348/36 |
| 7,193,645 B1 * | 3/2007 | Aagaard et al. | 348/211.3 |
| 7,206,344 B1 * | 4/2007 | Desai | 375/240 |
| 7,325,735 B2 * | 2/2008 | Kurzweil et al. | 235/454 |
| 7,466,336 B2 * | 12/2008 | Regan et al. | 348/50 |
| 2001/0019620 A1 * | 9/2001 | Nagai et al. | 382/104 |
| 2002/0063799 A1 * | 5/2002 | Ortiz et al. | 348/559 |
| 2003/0161507 A1 * | 8/2003 | Lawandy | 382/118 |
| 2003/0206232 A1 * | 11/2003 | Suzuki et al. | 348/211.1 |
| 2003/0227548 A1 * | 12/2003 | Kawakami et al. | 348/152 |
| 2004/0145653 A1 * | 7/2004 | Choi | 348/14.02 |
| 2004/0174434 A1 * | 9/2004 | Walker et al. | 348/211.3 |
| 2005/0001922 A1 * | 1/2005 | Lee et al. | 348/340 |
| 2005/0036067 A1 * | 2/2005 | Ryal et al. | 348/565 |
| 2005/0175257 A1 * | 8/2005 | Kuroki | 382/278 |
| 2006/0001682 A1 * | 1/2006 | Honda | 345/646 |
| 2006/0148517 A1 * | 7/2006 | Yu | 455/553.1 |

FOREIGN PATENT DOCUMENTS

| | | |
|---|---|---|
| EP | 1 507 419 A1 | 2/2005 |
| JP | 01051755 A | 2/1989 |
| JP | 08237629 A | 9/1996 |
| JP | 2000-137779 | 5/2000 |
| JP | 2004-048644 | 2/2004 |
| WO | WO 2004/040901 | 5/2004 |
| WO | WO 2004/040901 A1 | 5/2004 |

* cited by examiner

FACE IMAGE CORRECTION USING MULTIPLE CAMERA ANGLES

CROSS-REFERENCE TO RELATED APPLICATIONS

This application is a 35 U.S.C. §371 national phase application of PCT Application No. PCT/EP2005/052538, filed on Jun. 2, 2005, which claims priority from European Patent Application Serial No. 04103072.7 filed on Jun. 30, 2004, and which claims the benefit under 35 USC §119(e) of U.S. Provisional Application Ser. No. 60/585,979 filed on Jul. 7, 2004, the disclosures of which are incorporated by reference herein in their entireties. The above-referenced PCT International Application was published in the English language as International Publication No. WO 2006/003066.

FIELD OF THE INVENTION

The present invention relates generally hand-held radio communication terminals with built-in cameras, and in particular to the use of such terminals for video conference communication.

BACKGROUND

The cellular telephone industry has had an enormous development in the world in the past decades. From the initial analog systems, such as those defined by the standards AMPS (Advanced Mobile Phone System) and NMT (Nordic Mobile Telephone), the development has during recent years been almost exclusively focused on standards for digital solutions for cellular radio network systems, such as D-AMPS (e.g., as specified in EIA/TIA-IS-54-B and IS-136) and GSM (Global System for Mobile Communications). Currently, the cellular technology is entering the so called $3^{rd}$ generation 3G, providing several advantages over the former, $2^{nd}$ generation, digital systems referred to above.

Many of the advances made in mobile phone technology are related to functional features, such as better displays, more efficient and longer lasting batteries, and means for generating polyphonic ring signals. One functional feature which has been more and more common is built-in cameras. Cameras with video camera functionality are today available in several mobile phones. With the entrance of high bit-rate services, such as EDGE (Enhanced Data-rates for GSM) and 3G the usability for video-related services will increase. For one thing, mobile video telephony, with simultaneous communication of sound and moving images, has recently become commercially available.

For stationary use, video conference systems generally include a camera mounted on or beside a communication terminal, such as a personal computer PC, or integrated in an IP phone. Use of such a system is fairly straightforward, as the user is positioned in front of the terminal with the camera aiming towards the user. However, mobile video conferencing with face to face transmission suffers from one main drawback. When communicating through a mobile handheld terminal, the user has to hold the terminal steady in front of the face so that the receiving party can see the face of the user, i.e. the sending party. The terminal has to be aimed more or less 90° to the face, in order to get a usable image of the user. A problem is that the user will get tired in the arm, and thereby tend to tremble and also hold the terminal lower and lower. The result is that the image captured will show more of the neck and chin portion of the user, than the upper part of the face. This lowers the value of the service as it is experienced as difficult to use. Furthermore, it is appreciated that consumers may want to be able to view the surroundings when engaged in a video conference, but a mobile phone will block at least parts of the field of view if it has to be held in front of the face.

SUMMARY OF THE INVENTION

A general object of the invention is therefore to provide improved means for picture and video conference systems using mobile hand-held terminals. In particular, an object of the invention is to provide a more convenient method for video conferencing by means of hand-held mobile terminals, overcoming the identified drawbacks related to the prior art.

According to a first aspect, this object is fulfilled by a method for adjusting a picture of an object captured by a camera in a handheld radio communication terminal, comprising the steps of:

defining a first camera angle to the object;

capturing an image of the object by means of said camera from a second camera angle to the object, offset from said first camera angle;

storing image data relating to the captured image; and generating an angularly adjusted image of said object, dependent on said image data, and an angular relation between said first camera angle and said second camera angle.

Preferably, said method comprises the steps of:

storing reference image data relating to a reference image of the object from said first camera angle, wherein said step of generating an angularly adjusted image of said object is also dependent on said reference image data.

In one embodiment, said method comprises the step of:

capturing said reference image of the object from said first camera angle.

In one embodiment, said captured image is a moving image, and wherein said step of generating an angularly adjusted image involves generating a moving adjusted image in real time.

In one embodiment, said step of generating the angularly adjusted image comprises the steps of:

digitally identifying corresponding structures in said captured image and said reference image;

establishing a mathematical transform from a mathematical relation between spatial image data of said image data and of said reference image data, for said corresponding structures; and transforming said captured image to appear as captured from said first camera angle by applying said mathematical transform to said image data.

In one embodiment, said step of generating the angularly adjusted image comprises the steps of:

digitally identifying a key feature in said captured image and in said reference image;

detecting movement of said key feature in said captured image;

filtering out said movement from said captured image; and applying said movement to said key feature in the reference image for obtaining an adjusted image.

In one embodiment, said step of generating the angularly adjusted image comprises the steps of:

slanting said captured image to compensate for the difference between said first camera angle and said second camera angle; and zooming and cropping the slanted image.

In one embodiment, said first camera angle is a predetermined camera angle to the object.

In one embodiment, said first camera angle is selected from a plurality of selectable preset angles, by means of an input command to the terminal.

In one embodiment, said second camera angle is sensed by an angle sensor in said terminal.

In one embodiment, said second camera angle is selected from a plurality of selectable preset angles, by means of an input command to the terminal.

In one embodiment, said method comprises the steps of:
encoding said adjusted image into a radio signal; and
transmitting said radio signal from said terminal.

In one embodiment, said method comprises the steps of:
encoding the image data for said captured image, together with data for said angular relation between the first camera angle and the second camera angle, into a radio signal;
transmitting said radio signal from said terminal;
receiving said radio signal in a radio signal receiving device; and
generating said angularly adjusted image of said object in said device.

In one embodiment, said object is the face of a user holding the terminal.

According to a second aspect, the objects stated above is fulfilled by a mobile radio communication terminal, comprising a camera for capturing images, and means for generating and transmitting a radio signal comprising captured images to a recipient, characterised by an image adjusting mechanism, including a memory for storing an angle value for a first camera angle to an object, and an angle value for a second camera angle, offset from said first camera angle, said image adjusting mechanism further comprising an image processing system devised to process an image of said object captured by said camera from said second camera angle, including means for generating an angularly adjusted image of said object, dependent on image data for said image, and on an angular relation between said first camera angle and said second camera angle.

In one embodiment, said memory further includes reference image data relating to a reference image of the object from said first camera angle, wherein said means of the image processing system are devised to generate said angularly adjusted image of said object dependent on said reference image data.

In one embodiment, said camera is devised to capture moving images, and wherein said image processing system comprises means for generating a moving adjusted front image in real time.

In one embodiment, said image processing system comprises means for digitally identifying corresponding structures in said captured image and said reference image; means for establishing a mathematical transform from a mathematical relation between spatial image data of said image data and of said reference image data, for said corresponding structures; and means for transforming said captured image to appear as captured from said first camera angle by applying said mathematical transform to said image data.

In one embodiment, said image processing system comprises means for digitally identifying a key feature in said captured image and in said reference image; means for detecting movement of said key feature in said captured image; means for filtering out said movement from said captured image; and means for applying said movement to said key feature in the reference image for obtaining an adjusted image.

In one embodiment, said image processing system comprises means for slanting said captured image to compensate for the difference between said first camera angle and said second camera angle; and means for zooming and cropping the slanted image.

In one embodiment, said first camera angle is a predetermined camera angle to the object.

In one embodiment, said first camera angle is selected from a plurality of selectable preset angles, by means of an input command to the terminal.

In one embodiment, said second camera angle is sensed by an angle sensor in said terminal.

In one embodiment, said second camera angle is selected from a plurality of selectable preset angles, by means of an input command to the terminal.

In one embodiment, said image processing system comprises means for encoding said adjusted image into a radio signal; and means for transmitting said radio signal from said terminal.

In one embodiment, said object is the face of a user holding the terminal.

BRIEF DESCRIPTION OF THE DRAWING

The features and advantages of the present invention will be more apparent from the following description of the preferred embodiments with reference to the accompanying drawing, on which FIG. 1 schematically illustrates use of a hand-held radio communication terminal in a typical video conference mode.

DETAILED DESCRIPTION OF PREFERRED EMBODIMENTS

The present description relates to the field of hand-held radio communication terminals. The term radio communication terminal, or terminal in short, includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants) and DECT terminals (Digital Enhanced Cordless Telephony). Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawing.

Figure 1:
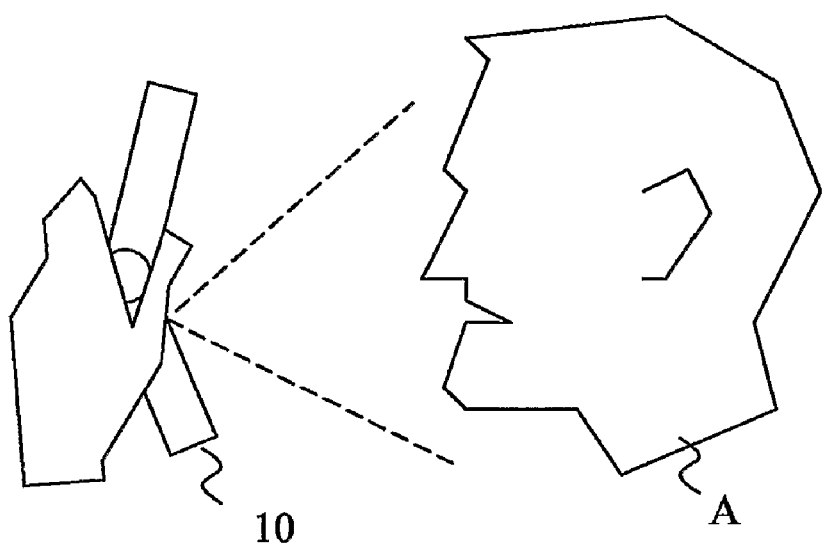
Figure 2:
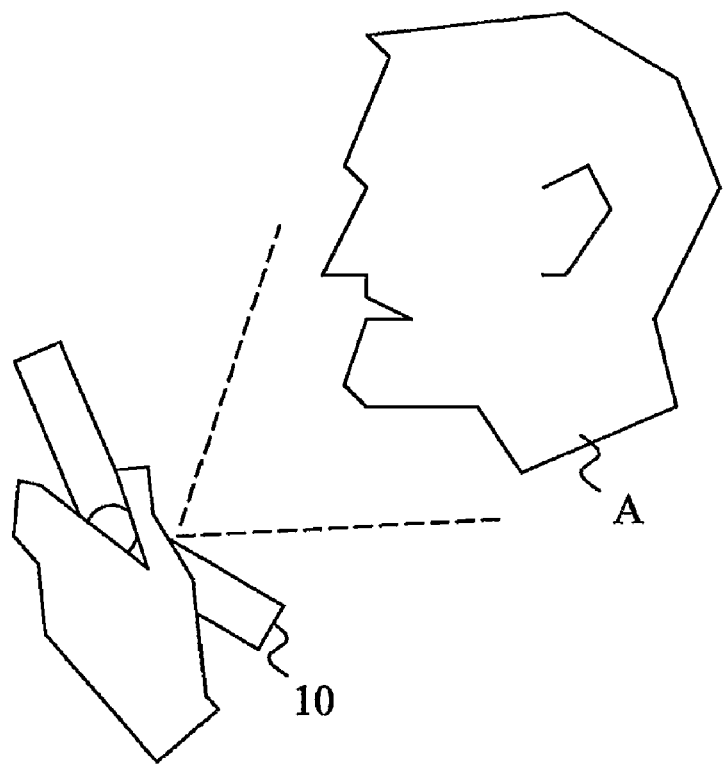
FIG. 2 illustrates the typical position of the terminal after a moments use according to FIG. 1.

FIG. 1 illustrates the use of a hand-held radio communication terminal 10 comprising a built-in camera, in a typical video conference mode. User A holds the terminal 10 is held in front of him, for the purpose of capturing real time moving images of his face. The captured images are recorded and encoded in synchronicity with input sound, typically speech from user A. A radio signal carrying sound and video data is generated in terminal 10 and transmitted to a recipient, typically another user with a video communication terminal. User studies have shown that the obviously uncomfortable pose illustrated in FIG. 1 is not maintained for long, and after a while the user A begins to lower his terminal 10 to the position illustrated in FIG. 2. The result is an image, snapshot or video, which is offset in angle to the initial image captured in the pose of FIG. 1. An image captured in the pose of FIG. 2 will target the chin portion of user A, and will generally be perceived as less attractive than the intended image of the entire face as seen from the front.

In order to overcome this problem, the present invention provides a function in a hand-held radio communication terminal, such as a mobile phone, which allows the terminal to send a picture that looks like a front image of the face although the camera of the terminal is positioned with an offset angle to the face, as compared from a front view.

Figure 3:
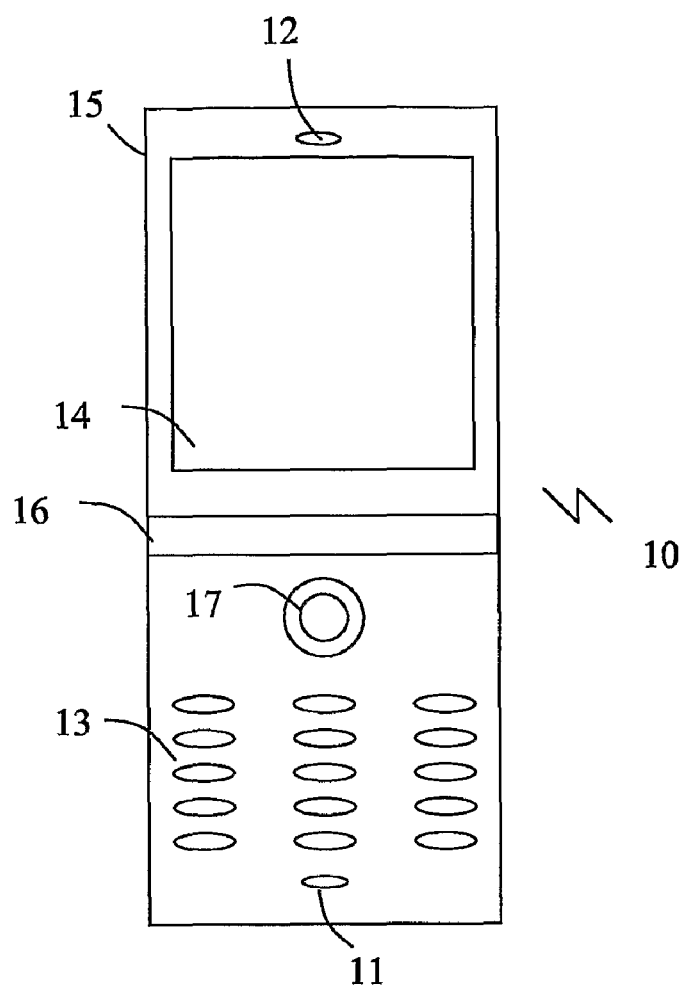
FIG. 3 schematically an embodiment of a radio communication terminal on which the present invention may be used.

FIG. 3 illustrates a radio communication terminal in the embodiment of a clamshell cellular mobile phone 10. It should be understood, though, that the invention is in no way restricted to clamshell terminals. Terminal 10 comprises a chassis or housing 15, of which a lower portion carries a user audio input in the form of a microphone 11, and where an upper portion carries a user audio output in the form of a loudspeaker 12. The upper and lower portions are connected by means of a hinge 16. A set of keys, buttons or the like constitutes a data input interface 13, usable e.g. for dialling, according to the established art. A data output interface comprising a display 14 is further included, devised to display communication information, address list etc in a manner well known to the skilled person. Radio communication terminal 10 further includes an antenna and radio transmission and reception electronics (not shown). A camera 17, preferably with video capability, has a lens facing the same way as display 14.

Figure 4:
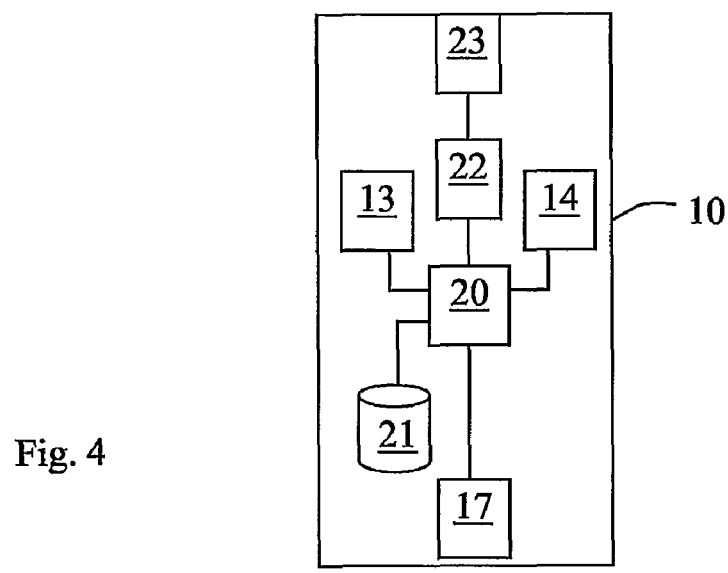
FIG. 4 schematically illustrates the terminal of FIG. 3 in a block diagram of functional elements which are relevant to different embodiments of the present invention.

FIG. 4 illustrates functional components of terminal 10. A computer processor system includes an image processing system 20 for processing images stored in a memory 21, and in particular images captured by means of camera 17. Image processing system 20 is preferably controlled by a microprocessor with associated software, forming part of the computer processor system of terminal 10.

In accordance with a first general embodiment, a front image is initially captured upon or before commencing a video conference, from a first camera angle as illustrated in FIG. 1. Preferably this is performed in a special capture mode, which mode may be entered by means of keypad 13. Data for the captured front image is stored in memory 21 as reference image data for the object in question, which is the face of user A. The reference image data may include image data representing the full front image, or only parts of the front image. During the subsequent video conference, moving images of the face of user A are captured by means of camera 17. The image processing system 20 constantly monitors the captured images and compares them to the reference image. When terminal 10, and thus camera 17, is tilted, raised or lowered, such that an image is captured from a second camera angle which is offset at most 90° from the first camera angle, image processing system 20 is devised to automatically generate an adjusted front image from said offset image by using said reference image, which adjusted front image appears as captured from the first camera angle directly in front of the face. The adjusted front image is subsequently encoded into a radio signal by signal encoding means of a radio transceiver 22, and transmitted from said terminal by means of an antenna 23. Alternatively, adjustment data for the captured offset image is transmitted as meta data together with the reference image, which adjustment data is dependent on at least the angular relation between the first and second camera angles. An adjusted image is instead subsequently established by means of the received reference image and adjustment data at a recipients communication terminal, or in another device.

In a first specific embodiment, this generation of an adjusted front image is achieved by the image processing system digitally identifying corresponding structures in said reference image and said captured image. These structures may e.g. be contours, shades, colour separations and so on, as is well known in the art of image processing. Once the structures have been identified, a mathematical transform is derived from the mathematical relation between spatial image data of the reference image and of the captured image for said corresponding structures. The offset image is then transformed to appear as captured from said first angle by applying said mathematical transform to the image data of the captured image. Preferably, the adjusted image is established using the mathematical relation between discrete points in the images for establishing the transform, and subsequently applying the transform to every pixel in the offset image for performing the angular adjustment of the captured image.

Figure 5:
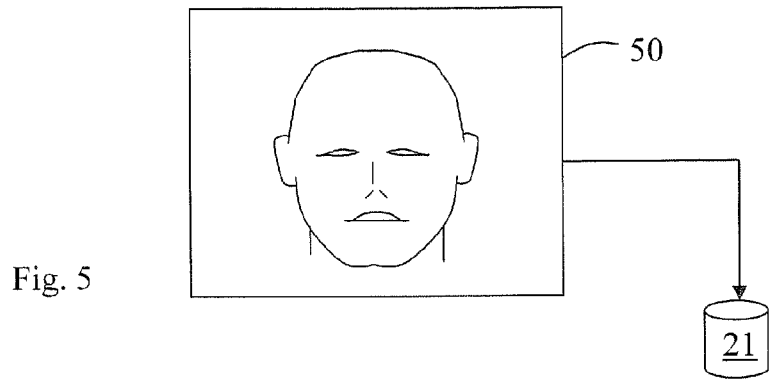
FIG. 5 schematically illustrates capturing and storing of a reference image.
Figure 6:
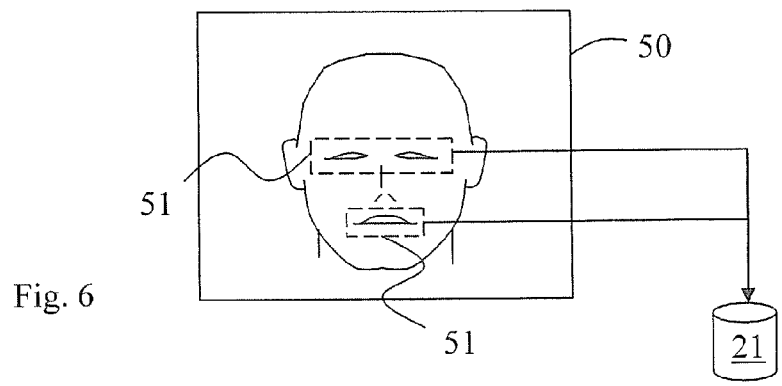
FIG. 6 schematically illustrates identification and storing of key features of a reference image.
Figure 7:
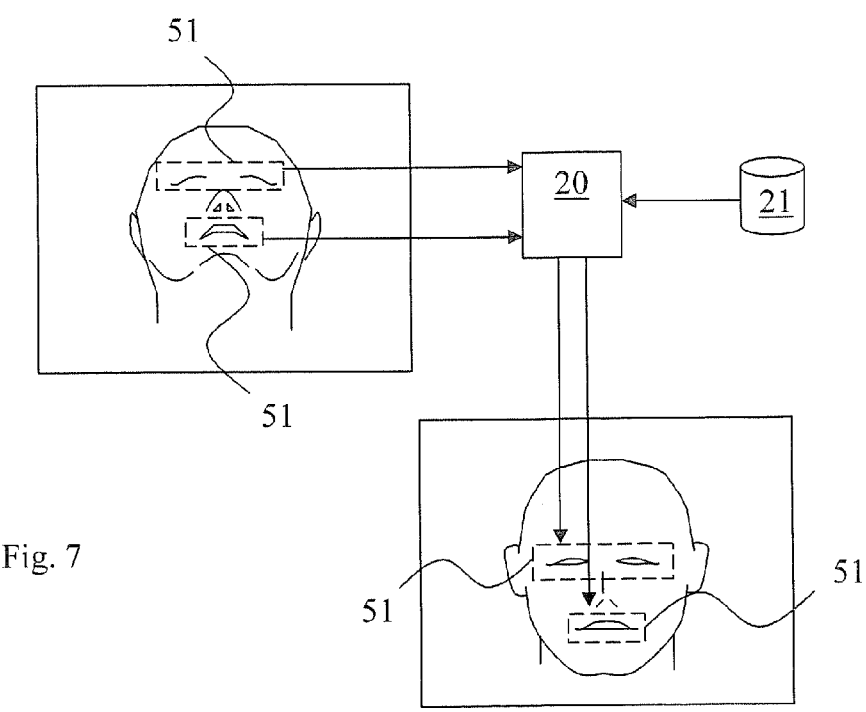
FIG. 7 schematically illustrates identification and storing of key features of an offset image, and application of detected movements in the key features of the offset image to corresponding key features of a reference image.

In a second specific embodiment, illustrated in FIGS. 5-7, the image processing system makes use of a digital filtering function. A reference image 50 of a user is first stored in memory 21, as illustrated in FIG. 5. Key features 51, in the illustrated example the eyes and mouth of the user, are subsequently digitally identified in reference image 50, according to FIG. 6. Digital coordinate data and signal data for the key features are stored in Memory 21. This may be an automatic process step. Alternatively, the key features may be selectively identified by the user. This may be achieved by displaying the reference image on display 14, and marking selected areas in the reference image as key features by means of a cursor controlled by buttons on keypad 13, a jog ball, or a joystick. For video conferencing purposes, such key features preferably include the user's eyes and mouth, as illustrated.

When live moving images are captured by camera 17 during a video conference, image processing system 20 is devised to monitor and detect movement of the said key features 51, as is illustrated in FIG. 7. The detected movement is then filtered out from the live image by means of image processing system 20. Subsequently, the detected movement is applied to the key features 51 in reference image 50. Thereby, an adjusted front image is generated, by applying movement of selected portions of a live image to the corresponding portions of a reference image 51. In particular, even if the live image is taken from an angle which is offset from the first angle from which the reference image was captured, the resulting adjusted image will be perceived as captured from the front as illustrated in FIG. 1.

Also in this case, a mathematical transform may be used for rotating the selected image portions with regard to the angle offset. In another specific embodiment, a morphing technique is instead used for applying movement to the selected key features in the reference image, based on detected spatial movement in the horizontal and vertical direction in the offset image.

A second general embodiment for avoiding undesired images is to slightly slant an image taken from an offset angle, which gives an impression of an angular adjustment of the captured image. This is described with reference to FIGS. 8-11. This process may be a manual operation or an automatic operation in case the mobile phone is equipped with some kind of motion sensor, devised to sense how the camera is altered from an original perpendicular position. It is however preferable that this is made manually since it is a subjective image that is produced.

Figure 8:
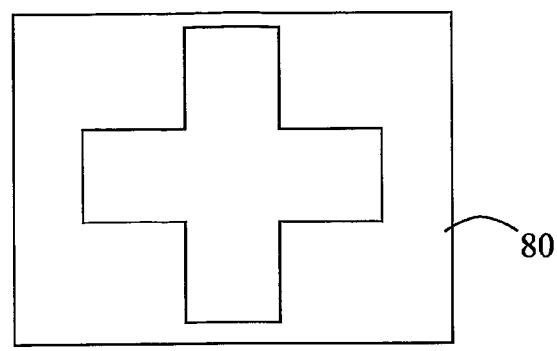
FIG. 8 schematically illustrates a captured image of an object from a first angle.
Figure 9:
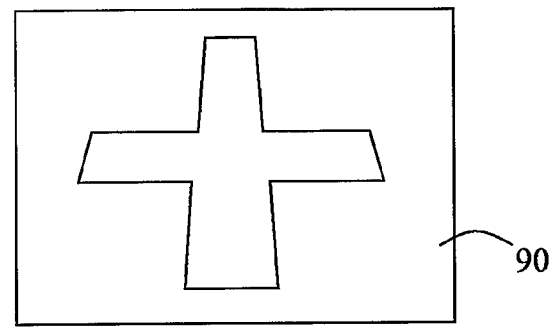
FIG. 9 schematically illustrates a captured image of the same object from a second, offset, angle.
Figure 10:
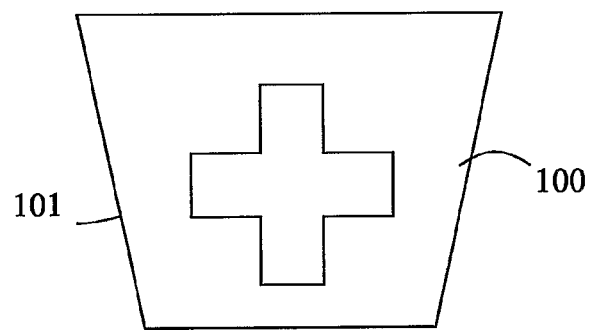
FIG. 10 schematically illustrates a slanted image of the image of FIG. 9.
Figure 11:
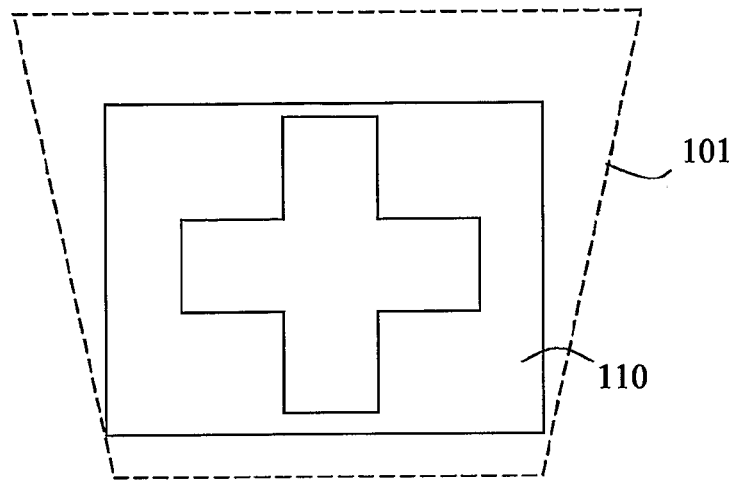
FIG. 11 schematically illustrates a zoomed and cropped image of the slanted image of FIG. 10.

FIG. 8 illustrates an image 80 of an object in the shape of a cross, captured from a first perpendicular camera angle in front of the object. When the camera used for capturing the image is dropped, the image will reflect the perspective of the second camera angle in question, as illustrated in FIG. 9. A slanted image may then be derived from captured image 90, for compensating the angular difference between the camera angle of image 80 and image 90. Such a slanted image 100 is shown in FIG. 10. Finally, the slanted image 100 is zoomed and cropped to avoid the slanted image borders 101, upon which a corrected image 110 is obtained, as illustrated in FIG. 11.

When using video telephony it often happens that the users face is moved outside the camera viewfinder. The user may do something else while talking to the other party and can not focus on the mobile phone camera all the time. According to an embodiment of the invention, this problem is overcome by activating an optical tracking system in the terminal to track the users movement using the viewfinder image data. A tracking system identifies one or several tracking points, e.g. high contrast changes in an image could be a valid tracking point candidate, and tries to follow them as good as possible. The tracking system can handle zoom, pan and rotation. If the tracking system is used in addition to a motorized camera, the users face can be in focus even if it is slightly moved. The camera motor must be able to move its angle in horizontal and vertical led and rotation for such an embodiment.

The angular movement of the camera in relation to the object, i.e. between a first camera angle and a second camera angle, may be defined manually, e.g. by means of the terminal keypad. Alternatively, an angle sensor may be incorporated, such that tilting of the camera from a certain angle is sensed, e.g. by means of an accelerometer. Another alternative is to employ an absolute angle sensor, e.g. by means of a pendulum device. In one embodiment, an angle preset is selectable in the terminal. Selecting for instance a 45° preset indicates that the camera of the terminal will be held such that it is aimed from 45° below a horizontal position to an object. Image processing system 20 is thereby arranged to process captured images to generate adjusted images of captured images, to appear as taken from a horizontal position in relation to the object. This way, an entire video conference may be held with the terminal held at a 45° angle, which is more comfortable for the user. Any of the previously described methods for adjusting the image to appear as captured from a horizontal direction may be used. Needless to say, a preset angle may be selected from a plurality of different preset angles, such as e.g. +45°, −45°, and 0°, or even a more detailed range e.g. in steps of 10°. For the embodiment described with reference to FIGS. 8-11, the reference image of FIG. 8 is not necessary for this specific embodiment using angle presets. If e.g. a camera angle preset of 45° is set in the terminal, a first camera angle is defined as 45° higher in a vertical plane than the capture camera angle, which is the second camera angle.

The principles of the present invention have been described in the foregoing by examples of embodiments and modes of operations. The main advantage with the invention is that a user in a mobile video conference can sustain a transmission without having to keep the terminal in a tiring position, and still provide an attractive picture of the face. It should be noted though, that the present invention is not restricted to images captured of the user by him- or herself. Indeed, the present invention is usable for capturing images of any type of object, in particular where it is of interest to depict the object from a certain angle. The invention should therefore not be construed as being limited to the particular embodiments discussed above, and it should be appreciated that variations may be made in those embodiments by persons skilled in the art, without departing from the scope of the present invention as defined by the appended claims.

The invention claimed is:

1. A method of adjusting real-time moving images of an object captured by a camera in a mobile radio communication terminal, comprising:
    defining a first camera angle based on a first camera position of the camera relative to the object;
    capturing a reference still image of said object from said first camera angle using the camera;
    storing reference still image data relating to the reference still image of the object captured from the first camera angle in said mobile radio communication terminal;
    moving the camera from the first camera position relative to the object to a second camera position relative to the object;
    capturing real-time moving images of the object by means of the camera from a second camera angle based on the second camera position relative to the object, wherein the second camera angle is offset from the first camera angle;
    storing moving image data relating to the captured real-time moving images in said mobile radio communication terminal; and
    generating angularly adjusted moving images of the object in response to the moving image data and an angular relation between the first camera angle of the camera and the second camera angle of the camera, wherein the step of generating angularly adjusted moving images of the object is also dependent on the reference still image data, and wherein the step of generating angularly adjusted moving images comprises generating the angularly adjusted moving images in real time, and wherein the object captured by said camera is the face of a user using said mobile radio communication terminal.

2. The method as recited in claim 1, wherein generating the angularly adjusted moving images comprises:
    digitally identifying corresponding structures in the captured real-time moving images and the reference still image;
    establishing a mathematical transform from a mathematical relation between the moving image data of the real-time moving images and of the reference still image data, for the corresponding structures; and
    transforming the captured real-time moving images to appear as captured from the first camera angle by applying the mathematical transform to the moving image data.

3. The method as recited in claim 1, wherein generating the angularly adjusted moving images comprises:
   digitally identifying a key feature present both in the captured real-time moving images and in the reference still image;
   detecting movement of the key feature in the captured real-time moving images;
   filtering out the movement from the captured real-time moving images; and
   applying the movement to the key feature in the reference still image for obtaining adjusted real-time moving images.

4. The method as recited in claim 1, wherein generating the angularly adjusted real-time moving images comprises:
   slanting the captured real-time moving images to compensate for a difference between the first camera angle and the second camera angle; and
   zooming and cropping the slanted real-time moving images.

5. The method as recited in claim 1, wherein the first camera angle comprises a predetermined camera angle to the object.

6. The method as recited in claim 1, wherein the first camera angle is selected from a plurality of selectable preset angles, by means of an input command to the terminal.

7. The method as recited in claim 1, wherein the second camera angle is sensed by an angle sensor in the terminal.

8. The method as recited in claim 1, wherein the second camera angle is selected from a plurality of selectable preset angles, by means of an input command to the terminal.

9. The method as recited in claim 1, comprising:
   encoding the adjusted real-time moving images into a radio signal; and
   transmitting the radio signal from the terminal.

10. The method as recited in claim 1, comprising:
    encoding the image data for the captured real-time moving images, together with data indicative of the angular relation between the first camera angle and the second camera angle, into a radio signal;
    transmitting the radio signal from the terminal;
    receiving the radio signal in a radio signal receiving device; and
    generating the angularly adjusted real-time moving images of the object in the radio signal receiving device.

11. A mobile radio communication terminal, comprising:
    a camera configured to capture images including moving images;
    means for generating and transmitting a radio signal comprising captured images to a recipient; and
    an image adjusting mechanism, the image adjusting mechanism comprising:
    a memory configured to store a first angle value for a first camera angle based on a first camera position of the camera relative to an object, a second angle value for a second camera angle based on a second camera position of the camera relative to the object, wherein the second camera angle is offset from the first camera angle and the second camera position is different from the first camera position, and reference still image data relating to a reference still image of the object captured from the first camera angle; and
    an image processing system configured to capture the reference still image of the object from the first camera angle using the camera, to capture real-time moving images of the object from the second camera angle using the camera, to process the real-time moving images of the object captured from the second camera angle by generating angularly adjusted real-time moving images of the object in response to moving image data for the real-time moving images, in response to an angular relation between the first camera angle and the second camera angle, and in response to the reference still image data, wherein the image processing system is configured to generate the angularly adjusted moving images in real time, and wherein the object captured by said camera is the face of a user using said mobile radio communication terminal.

12. The mobile radio communication terminal as recited in claim 11, wherein the image processing system comprises:
    means for digitally identifying corresponding structures in the captured real-time moving images and the reference still image;
    means for establishing a mathematical transform from a mathematical relation between the moving image data and of the reference still image data, for the corresponding structures; and
    means for transforming the captured real-time moving images to appear as captured from the first camera angle by applying the mathematical transform to the moving image data.

13. The mobile radio communication terminal as recited in claim 11, wherein the image processing system comprises:
    means for digitally identifying a key feature in the captured real-time moving images and in the reference still image;
    means for detecting movement of the key feature in the captured real-time moving images;
    means for filtering out the movement from the captured real-time moving images; and
    means for applying the movement to the key feature in the reference still image for obtaining the adjusted real-time moving images.

14. The mobile radio communication terminal as recited in claim 11, wherein the image processing system comprises:
    means for slanting the captured real-time moving images to compensate for a difference between the first camera angle and the second camera angle; and
    means for zooming and cropping the slanted real-time moving images.

15. The mobile radio communication terminal as recited in claim 11, wherein the first camera angle comprises a predetermined camera angle to the object.

16. The mobile radio communication terminal as recited in claim 11, wherein the first camera angle is selected from a plurality of selectable preset angles, by means of an input command to the terminal.

17. The mobile radio communication terminal as recited in claim 11, wherein the second camera angle is sensed by an angle sensor in the terminal.

18. The mobile radio communication terminal as recited in claim 11, wherein the second camera angle is selected from a plurality of selectable preset angles, by means of an input command to the terminal.

19. The mobile radio communication terminal as recited in claim 11, wherein the image processing system comprises:
    means for encoding the adjusted real-time moving images into a radio signal; and
    means for transmitting the radio signal from the terminal.

* * * * *